United States Patent [19]

Sato

[11] Patent Number: 4,631,575
[45] Date of Patent: Dec. 23, 1986

[54] CHARGE TRANSFER DEVICE FOR FORMING DESIRED COLOR DIFFERENCE SIGNALS

[75] Inventor: Maki Sato, Sagamihara, Japan

[73] Assignee: Sony Corporation, Tokyo, Japan

[21] Appl. No.: 573,913

[22] PCT Filed: May 19, 1983

[86] PCT No.: PCT/JP83/00149
§ 371 Date: Jan. 19, 1984
§ 102(e) Date: Jan. 19, 1984

[87] PCT Pub. No.: WO83/04361
PCT Pub. Date: Dec. 8, 1983

[30] Foreign Application Priority Data

May 21, 1982 [JP] Japan .................................. 57-86254

[51] Int. Cl.[4] .................. H04N 9/67; H04N 9/64; H04N 9/04; H04N 9/07
[52] U.S. Cl. ................................ 358/30; 358/40; 358/41; 358/43; 358/44
[58] Field of Search ..................... 358/31, 41, 43, 44, 358/37, 40, 30; 357/24, 24 LR; 377/61, 62, 63

[56] References Cited

U.S. PATENT DOCUMENTS 4,337,403  6/1982  Berger et al. ........................ 377/61
4,387,389  6/1983  Tanigawa ............................. 357/24

OTHER PUBLICATIONS

Séquin, Carlo H., et al., *Charge Transfer Devices*, Academic Press, Inc., New York et al., 1975, pp. 48–50.

*Primary Examiner*—James J. Groody
*Assistant Examiner*—Randall S. Svihla
*Attorney, Agent, or Firm*—Hill, Van Santen, Steadman & Simpson

[57] ABSTRACT

A charge transfer device for forming color difference signals without an output circuit and a level adjusting circuit. A first color signal and a sequential signal formed of second and third color signals are formed during predetermined periods as charges which are then employed to form first and second color difference signals. The charges are first delayed by a predetermined time and then are combined to create first and second color difference signals. These first and second color difference signals are supplied to a switching processing section of a charge transfer device having two input terminals and two output terminals. The first and second color difference signals are switched at predetermined intervals so that the first color difference signal is separated and delivered to one output terminal, and the second color difference signal is separated and delivered to the other output terminal. The color difference signal charge transfer device may also be combined with a signal separating circuit also formed as a charge transfer device.

8 Claims, 7 Drawing Figures

CHARGE TRANSFER DEVICE FOR FORMING DESIRED COLOR DIFFERENCE SIGNALS

FIELD OF THE INVENTION

The present invention relates to a charge transfer device for processing color signals suitable for being applied to a color signal processing circuit in an image sensor which employs as its image sensing element a charge transfer element such as a CCD or the like.

DESCRIPTION OF THE PRIOR ART

When a matrix-type color filter F as shown in FIG. 1 is used to project an object onto a CCD used as an image sensing element to thereby produce predetermined color separated images from which respective dot sequential signals of primary color signals G, R and B are formed, and wherein desired color difference signals are formed from these dot sequential signals, a color signal processing circuit shown in FIG. 2 is generally used.

In FIG. 2, reference numeral 1 designates an object and 2 a CCD in which the dot sequential signals G and R are derived from n lines (odd line) and the dot sequential signals B and G are derived from n+1 lines (even line).

While these dot sequential signals are delivered as signal charges, these signals are converted to the voltages by an output circuit 3 provided at the rear stage thereof. The dot sequential signals converted to the voltage levels are supplied to a signal separating circuit 4. To the signal separating circuit 4 is supplied a switching pulse $P_S$, the period of which is equal to the pitch of the picture elements aligned in the horizontal direction and thereby the separation of the signals is carried out. From one output line thereof is separated and derived the primary color signal G, while from the other output line is separated and then derived the line sequential signal of R and B.

The line sequential signal of R and B is supplied to a simultaneous circuit 10 in which the primary color signals R and B are made simultaneous. For this purpose, the line sequential signal is supplied to a delay element 11 of CCD construction thereby delayed by one horizontal period. The delayed output (as a signal charge) therefrom is supplied again to an output circuit 12 and thereby converted to the voltage level. The delayed output which is converted to the voltage level is supplied to a switching circuit 13 together with the non-delayed output. Then, when the switching circuit 13 is alternately controlled in switching operation at one horizontal period, the primary color signals of R and B which are made simultaneous are formed.

The simultaneous primary color signals of R and B are supplied to a color difference signal generating circuit 15 together with the primary color signal G. And, as a result of logical calculation thereof, from a terminal 16 is derived a color difference signal (G-R), while from a terminal 17 is derived a color difference signal (G-B), respectively.

With such a color signal processing circuit, when the delay element 11 of the CCD construction shown in the figure is employed so as to make the line sequential signals of R and B simultaneous, the output circuit 12 must always be provided. However, since this output circuit 12 generally has a temperature characteristic, the delayed output and the non-delayed output become different from each other in level. Therefore, a level adjusting circuit is required for correcting the ordinary level error. In FIG. 2, reference numeral 14 designates a circuit for level adjusting as mentioned above.

As described above, the conventional color signal processing circuit requires the output circuit 12 and the level adjusting circuit 14. In addition, these circuits and the color difference signal generating circuit 15 can not be formed within the chip used to construct the delay element 11, but are connected thereto from the outside, making the circuit construction complicated and increasing the number of the assembly parts thereof. Of course, it is troublesome when adjustments of the level adjusting circuit 14 are manually required.

SUMMARY OF THE INVENTION

It is an object of the present invention to provide a charge transfer device for processing color signals which does not require an output circuit and a level adjusting circuit.

It is another object of the present invention to provide a charge transfer device for processing color signals in which, when red, green and blue primary color signals R, G and B are used as the color signals, a charge transfer element is used for signal processing to thereby enable a simultaneous circuit and a color difference signal generating circuit to be incorporated into one chip.

It is a further object of the present invention to provide a charge transfer device for processing color signals in which, when an image sensing element such as a CCD or the like is used, the circuit elements from the CCD all the way to the color difference signal generating circuit can be formed as one chip.

DESCRIPTION OF THE PREFERRED EMBODIMENTS

According to the present invention, the portion from a simultaneous circuit to a predetermined color difference signal generating circuit can be formed within one chip.

An embodiment of the present invention which is applied to the color signal processing circuit connected to the output stage of the above image sensing element 2 will be described with reference to FIG. 3 and the following.

Figure 3:
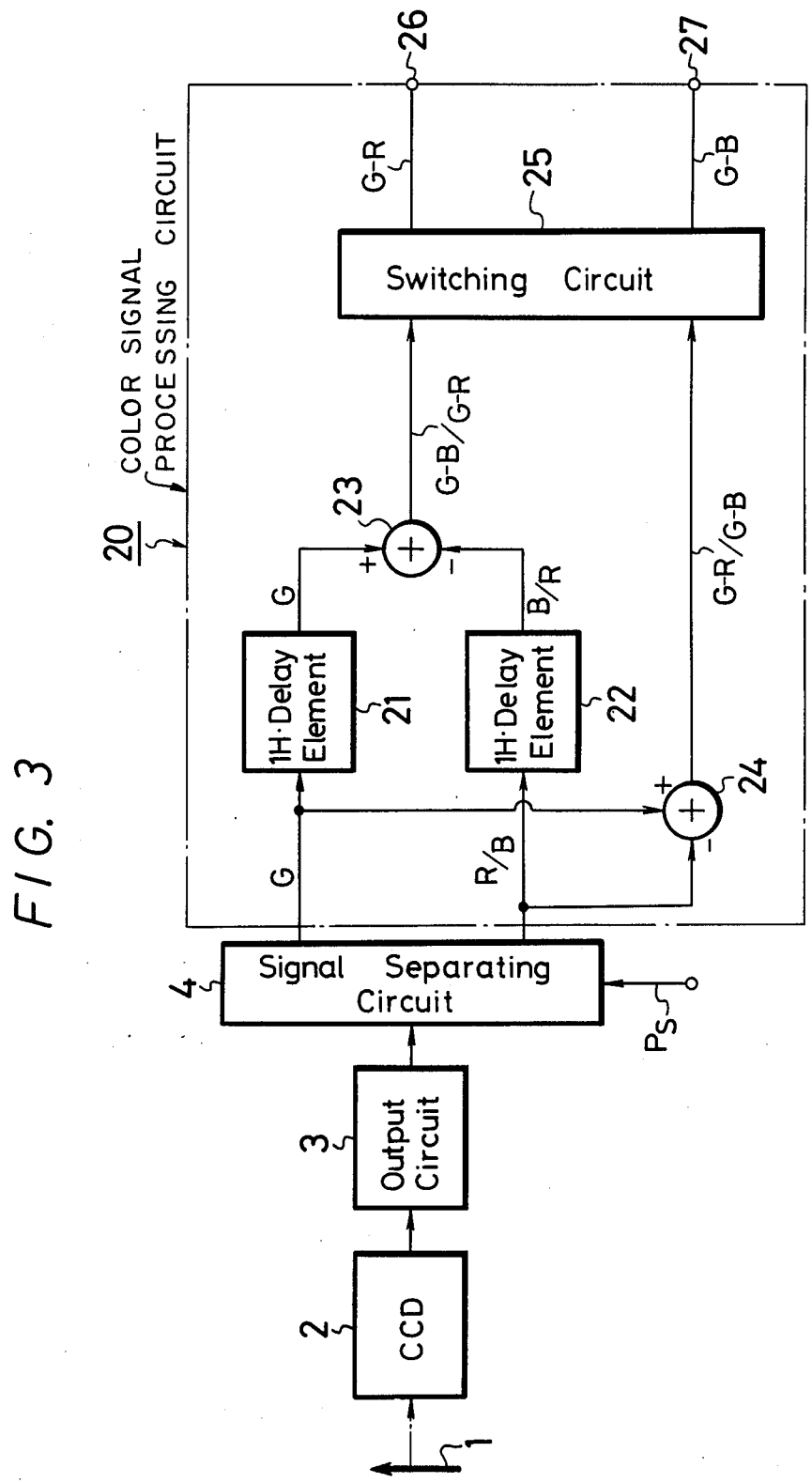
FIG. 3 is a systematic circuit block diagram showing an embodiment of a charge transfer device for processing color signals according to the present invention.

FIG. 3 shows the charge transfer device according to the present invention in the form of a circuit block diagram. Reference numeral 20 designates a color signal processing circuit having a simultaneous function which is an essential part of the present invention. As shown in the figure, it is formed of a pair of delay elements 21 and 22, each having a delay time of one horizontal period, a pair of processors 23 and 24, each having a subtracting processing function, and a switching circuit 25. All of these circuit elements are incorporated into the one chip.

To one delay element 21 is supplied the primary color signal G, while to the other delay element 22 is supplied the line sequential signal of the primary color signals R and B, the phase of which is inverted (180° phase difference). Thus, from one processor 23 are alternately derived a color difference signal (G-B) and a color difference signal (G-R) at every horizontal period, while from the other processor 24 are alternately derived a color difference signal (G-R) and a color difference signal (G-B) at every horizontal period. In this case, the same color difference signals derived from the processors 23 and 24 are displaced from each other by one horizontal period.

In the switching circuit 25, the switching control is carried out in such a manner that the color difference signal (G-R) is always derived from one terminal 26 and the color difference signal (G-B) is always derived from the other terminal 27.

Figure 4:
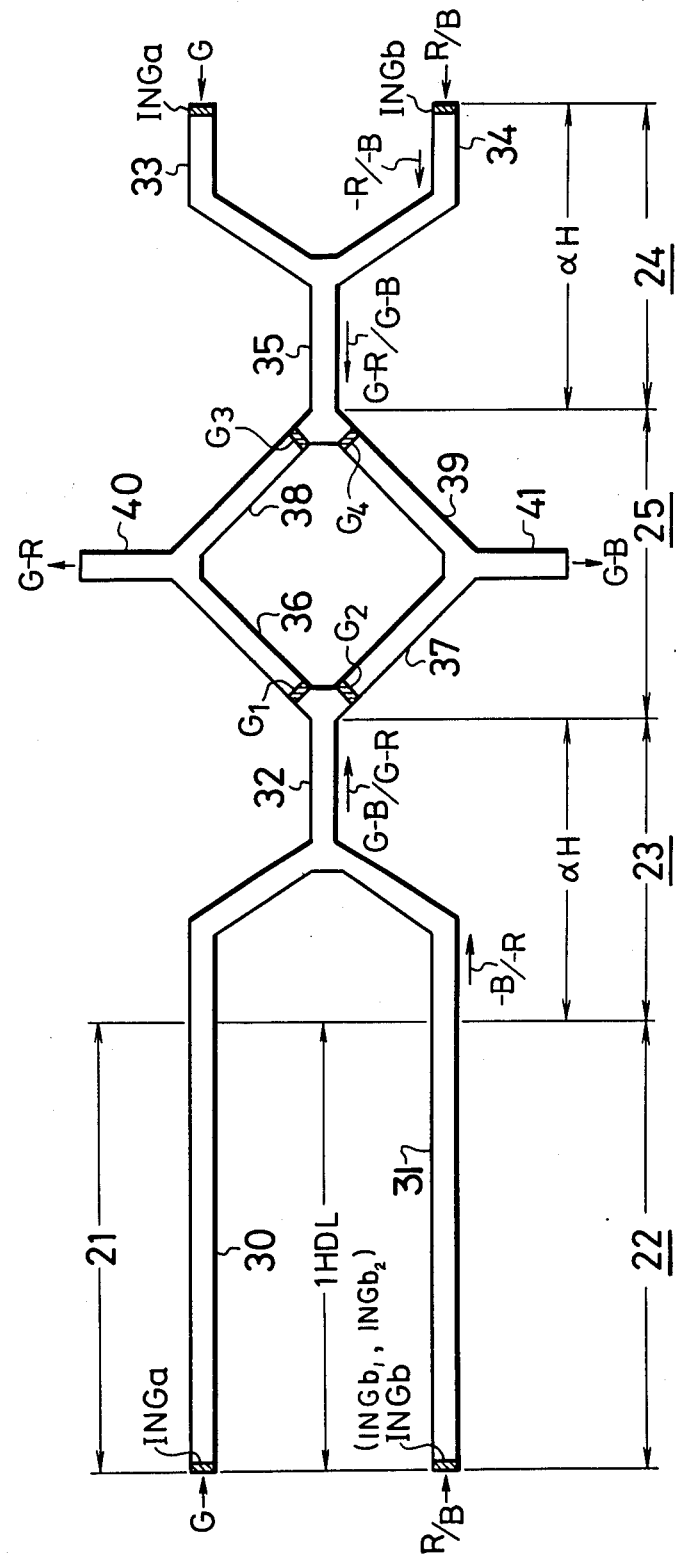
FIG. 4 is a conceptual construction diagram of the charge transfer device according to the present invention.

In the present invention, these circuits can be formed within the one chip. FIG. 4 shows an example of the construction thereof.

FIG. 4 is a conceptual plan diagram in which channels formed in the CCD chip are shown, highlighting the flow of signal charges, and in which first and second transfer channels 30 and 31, each having predetermined length and width, are formed substantially in parallel to each other, keeping a predetermined spacing therebetween. These transfer channels 30 and 31 are used as the delay elements 21 and 22 (having a length 1 HDL—a 1H delay) in which one input gate $ING_a$ is supplied with the primary color signal G (which is converted to the voltage), while the other input gate $ING_b$ is supplied with the line sequential signal R/B of the primary color signals R and B.

In order to form the color difference component, the line sequential signal R/B of R and B must be inverted in phase. As the phase inverting means, in addition to a method employing an inverter, there is a method which selects the terminal of the input gates. In the case of the latter, when the line sequential signal R/B is supplied to a second input gate $ING_{b2}$ (in addition to gate $ING_{b1}$—see FIG. 4), a line sequential signal $\overline{R/B}$, the phase of which is inverted, is obtained. FIG. 4 illustrates the resulting inversion (−B/−R) at the input to processor 23.

As the transfer clock system, there can be employed a 2-phase or a 3-phase transfer clock system, and other clock systems. The transfer channel may be formed of either a surface type or a buried type.

The respective one ends of the first and second transfer channels 30 and 31 are connected as shown in the figure to form a single transfer channel 32. Since the transfer channels are coupled together, the primary color signal G and the line sequential signal of R and B, which are transferred within the first and second transfer channels 30 and 31, are synthesized or formed together as signal charges to provide a resultant signal. Thus, the first and second transfer channels 30 and 31 are coupled to form the third transfer channel 32, thereby constructing the processor 23 (of time length αH) shown in FIG. 3

In like manner, a fourth transfer channel (input channel) 33 to which the primary color signal G is supplied, and a fifth transfer channel (input channel) 34 to which the line sequential signal of R and B is supplied, are formed, respectively. And, there is formed a sixth transfer channel 35 which forms the signal charges into a resultant signal. Namely, these three transfer channels 33 to 35 constitute the processor composer 24 (of time length αH).

The third and sixth transfer channels 32 and 35 each separate into two branches to form branched transfer channels 36 to 39. Also, the first and third branched transfer channels 36 and 38 and the second and fourth branched transfer channels 37 and 39 are each coupled together to form output transfer channels 40 and 41. Gate electrodes $G_1$ to $G_4$ are formed at the respective input portions of the plurality of branched transfer channels 36 to 39 to control the transfer condition of the signal charges.

The plurality of branched transfer channels 36 to 39 and the pair of output transfer channels 40 and 41 constitute the switching circuit 25 shown in FIG. 3. For this purpose, the first and fourth gate electrodes $G_1$ and $G_4$ are commonly supplied with a gate pulse $P_{GA}$ shown in FIG. 5A, while the second and third gate electrodes $G_2$ and $G_3$ are commonly supplied with a gate pulse $P_{GB}$ shown in FIG. 5B which changes complementarily relative to the gate pulse $P_{GB}$.

The channel length from the transfer channels 32 to 36, the channel length from the transfer channels 32 to 37, the channel length from the transfer channels 33 to 38, and the channel length from the transfer channels 34 to 39 are selected to be equal, respectively.

With this construction, at the third transfer channel 32 and the sixth transfer channel 35 are obtained the color difference signals corresponding to the respective horizontal lines as shown on Table-1.

TABLE 1

| horizontal line | channel | |
|---|---|---|
| | Third transfer channel 32 | Sixth transfer channel 35 |
| odd line | G − B | G − R |
| even line | G − R | G − B |

Accordingly, if the relation among gate pulses $P_{GA}$, $P_{GB}$ and the horizontal line is determined as shown in FIG. 5, and if it be assumed that when the levels of the gate pulses $P_{GA}$ and $P_{GB}$ are low, the gates are opened so as to transfer the signal charges therethrough. On the odd line, the second and third gate electrodes $G_2$ and $G_3$ become low in level so that the color difference signal (G-R) is delivered to one output transfer channel 40, while the color difference signal (G-B) is delivered to the other output transfer channel 41.

On the even line, the first and fourth gate electrodes $G_1$ and $G_4$ become low in level so that the color difference signal (G-R) is delivered to one output transfer channel 40, while the color difference signal (G-B) is delivered to the other output transfer channel 41.

As set forth above, according to the present invention, the process for providing the desired color difference signals from the primary color signal G and the line sequential signal R/B of R and B which are derived from the signal separating circuit 4 can be all carried out by use of signal charges. Thus, the output circuit and the level adjusting circuit for signal processing shown in the example of the prior art become unnecessary.

In the present invention, since the process for producing the color difference signals can be performed by use of signal charges, the simultaneous circuit 10 and the color difference signal generating circuit 15 of the prior art can be formed as one chip. As a result, the assembly parts which must be connected from the outside can be greatly reduced in number and the adjustment of the signal level or the like becomes unnecessary.

While in the above embodiment the signal processings from the simultaneous circuit 10 to the color difference signal generating circuit 15 are carried out as signal charges, it is also possible that the signal processings from the CCD 2 to the color difference signal generating circuit 15 are carried out as signal charges.

Figures 5A, 5B, 6:
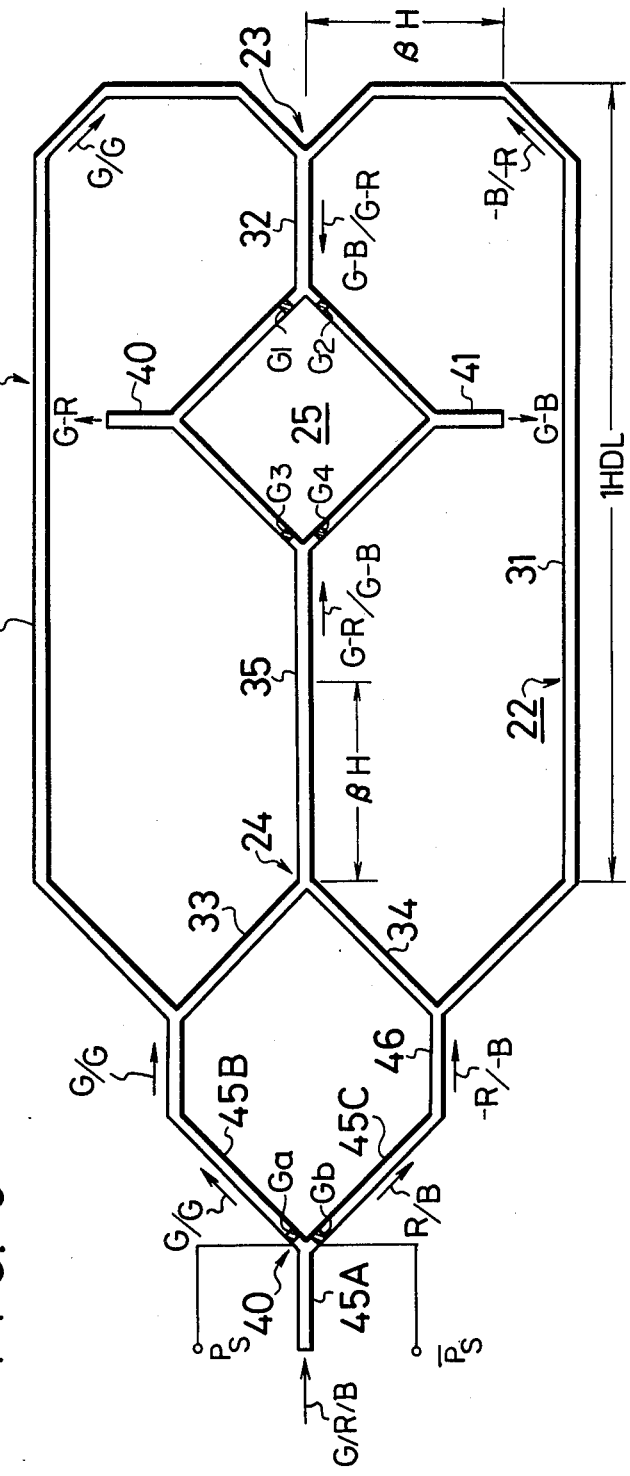
FIGS. 5A and 5B are a waveform diagrams of gate pulses.
FIG. 6 is a constructional diagram similar to FIG. 4, showing another embodiment of the present invention.

FIG. 6 is a conceptual construction diagram showing an example of such a charge transfer device. There is formed an input transfer channel 45 (45A to 45C) of Y-shape, and gate electrodes $G_a$ and $G_b$ are respectively provided at the branched portions thereof, thus constructing the signal separating circuit 4.

Accordingly, the input portion of the input transfer channel 45A is directly connected to the horizontal shift register in the CCD 2.

Figure 2:
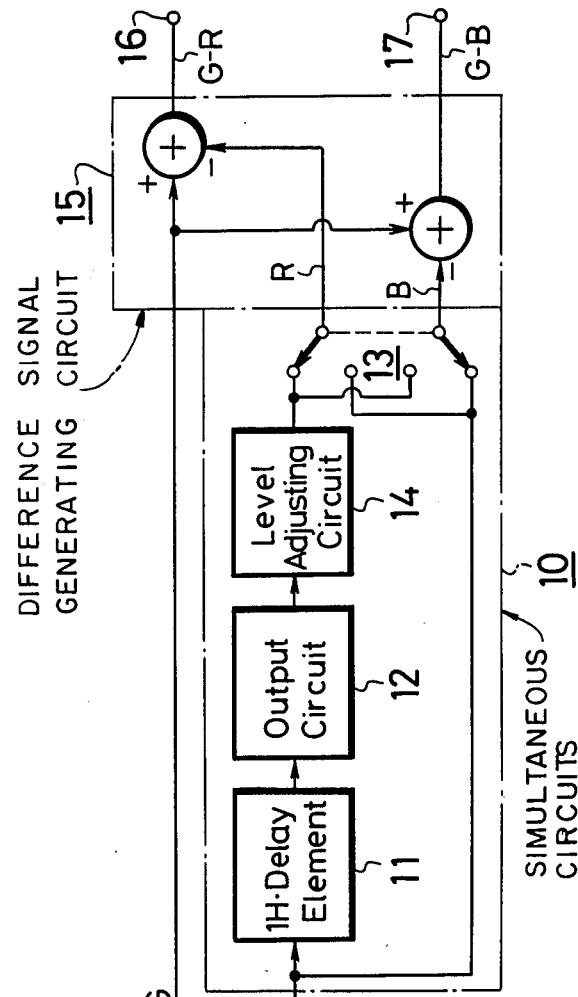
FIG. 2 is a systematic diagram showing an example of a conventional color signal processing circuit.

The gate electrodes $G_a$ and $G_b$ are controlled in such a manner that their gates are opened alternately. For this purpose, the switching pulse $P_S$ shown in FIG. 2 and the pulse $\overline{P_S}$ having the phase inverted relative to the former are supplied to the gate electrodes $G_a$ and $G_b$ by which the dot sequential signals of G, R and B derived from the CCD 2 are separated as signal charges. In this example, the primary color signal G is delivered to one branched transfer channel 45B, while the dot sequential signal R/B of R and B is delivered to the other branched transfer channel 45C.

The dot sequential signal R/B of R and B is inverted in phase by a succeeding transfer channel 46. The primary color signal G and the dot sequential signal of R and B are respectively supplied to the processors 23 and 24 shown in FIG. 4 in which the color difference signals are formed. The succeeding signal processing is carried out similarly as mentioned above and hence the explanation thereof will be omitted.

With the construction thus made, since the dot sequential signals derived from the CCD 2 can be processed as signal charges to thereby form the desired color difference signals, the signal processing system thus constructed can be formed as one chip.

In the above, the gate pulses $P_{GA}$ and $P_{GB}$ are used to perform the control of the switching operation. However, if the switching circuit is operated as a part of the transfer bit (if the transfer clock is supplied to the electrodes Ga and Gb to operate the electrodes as part of the transfer bit), such switching control is not required particularly. While the primary color signals G, R and B are used as the first to third color signals, other color signals can be used.

Figure 1:
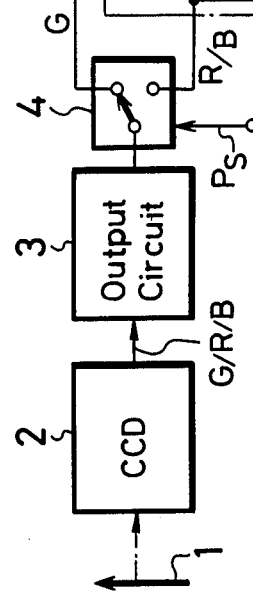
FIG. 1 is a plan diagram showing an example of a color filter.

Further, while in the above the present invention is applied to the color signal processing circuit in a color image sensor of a single plate type which employs the color filter shown in FIG. 1, this invention can also be applied to a color signal processing circuit in a color image sensor which employs a plurality of color filters to generate as the dot sequential signals any two primary color signals of the G, R and B.

Furthermore, while in the above embodiments the present invention is applied to the color signal processing system in the color image sensor, the present invention can be applied to other color signal processing system, as well.

Although various minor changes and modifications might be proposed by those skilled in the art, it will be understood that I wish to include within the claims of the patent warranted hereon all such changes and modifications as reasonably come within my contribution to the art.

I claim as my invention:

1. A charge transfer device for processing color signals, comprising:
    signal separating means for forming a first color signal during predetermined periods and for forming a sequential signal formed of alternating second and third color signals such that only one of said second and third color signals is present during alternate ones of said predetermined periods;
    first charge transfer means for forming first color signal charges connected to receive said first color signal from said signal separating means;
    second charge transfer means for forming sequential signal charges connected to receive said sequential signal from said signal separating means;
    first combining means for combining the first color signal charges with the sequential signal charges during said predetermined periods so as to create sequential resultant signal charges formed of first and second resultant signal charges such that only one of said first and second resultant signal charges is present during alternate ones of said predetermined periods; and
    switching means having a first input and two outputs, wherein said switching means receives the sequential resultant signal charges formed of the first and second resultant signal charges at the first input and outputs the first resultant signal charges at one output and the second resultant signal charges at the other output during said predetermined periods.

2. A charge transfer device according to claim 1 wherein the switching means includes a second input, the first color signal is supplied to a third charge transfer means and the sequential signal is supplied to a fourth charge transfer means, and wherein a second combining means is connected to the third and fourth charge transfer means and to the second input of the switching means.

3. A charge transfer device according to claim 1 wherein said first, second, and third color signals are green, red, and blue dot-sequential color signals, respectively.

4. A charge transfer device according to claim 1 wherein the first and second resultant signal charges form color difference signals.

5. A charge transfer device according to claim 4 wherein said first resultant signal charges form a green-minus-red (G-R) color difference signal, and said second resultant signal charges form a green-minus-blue (G-B) color difference signal.

6. A charge transfer device according to claim 1 wherein the first charge transfer means comprises a first charge transfer channel, the second charge transfer means comprises a second charge transfer channel, the first combining means comprises a charge transfer channel with an input connected to outputs of the first and second charge transfer channels, and the switching means comprises first and second gated input charge transfer channels with inputs connected to an output of the charge transfer channel of the first combining means and with outputs connected to inputs of first and second output charge transfer channels.

7. A charge transfer device according to claim 6 wherein the switching means further comprises third and fourth gated input charge transfer channels with outputs connected to the inputs of the first and second output charge transfer channels and with inputs connected to an output of a charge transfer channel of a second combining means, an input of which is connected to third and fourth charge transfer channels.

8. A charge transfer device according to claim 1 wherein the signal separating means is formed as a charge transfer device and is connected to the inputs of the first and second charge transfer means.

* * * * *